June 3, 1930.  J. E. LE BUS  1,761,216
ROTARY DRILL
Filed Aug. 27, 1928
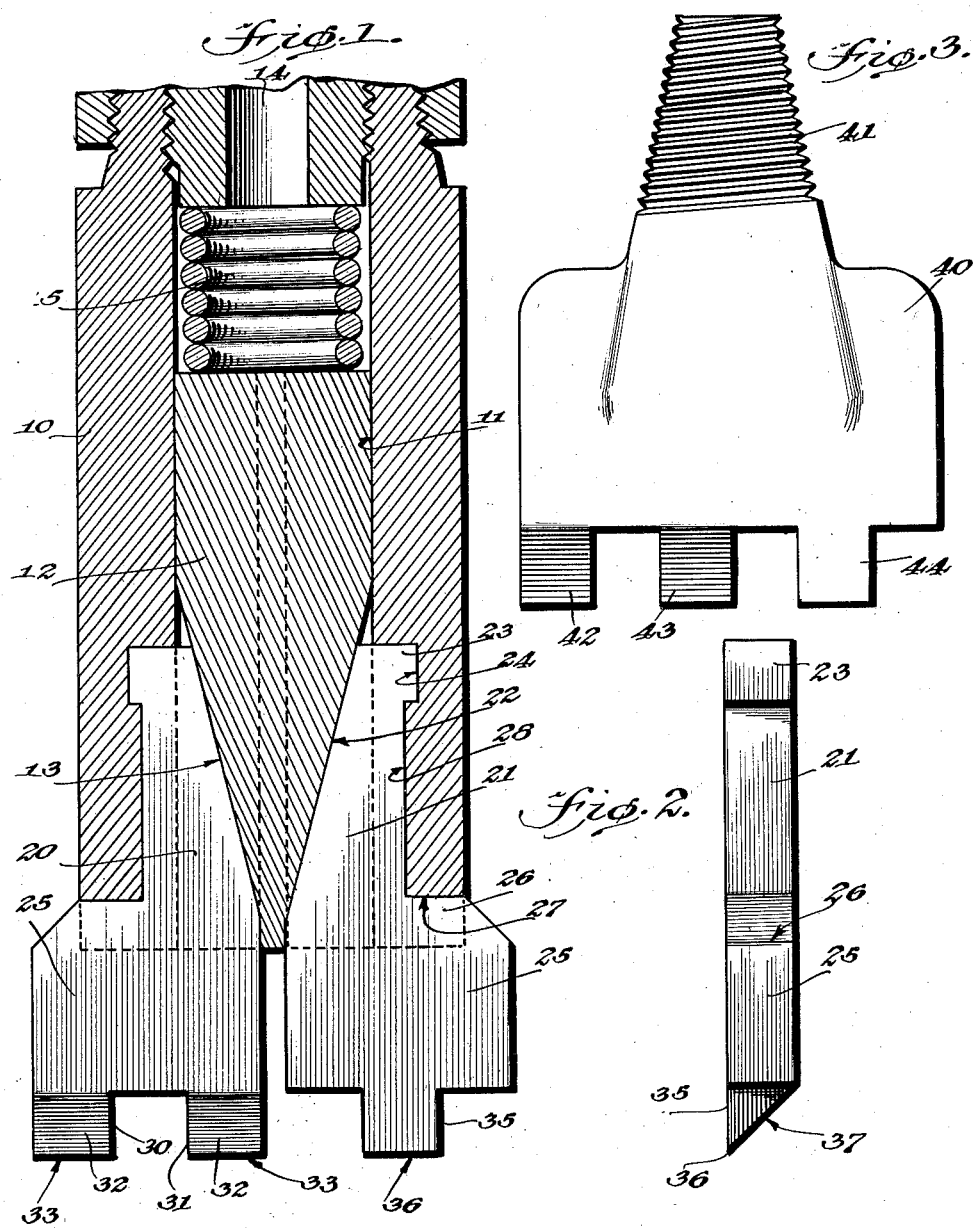
WITNESSES
INVENTOR
J. E. LeBus,
BY
ATTORNEY Patented June 3, 1930

1,761,216

UNITED STATES PATENT OFFICE

JOHN E. LE BUS, OF ELECTRA, TEXAS, ASSIGNOR, BY MESNE ASSIGNMENTS, TO O'DONOHOE DETACHABLE BLADE DRILLING BIT COMPANY, OF WICHITA FALLS, TEXAS, A CORPORATION

ROTARY DRILL

Application filed August 27, 1928. Serial No. 302,247.

This invention relates to rotary drills and is more particularly directed to the construction of a cutting blade for the drill.

An object of the invention is the provision of a rotary drill having removably mounted cutting blades, the blades being spaced from each other a distance which approximates the width of a blade.

A further object of the invention is the provision of a rotary drill having means for removably mounting a plurality of shanks provided with cutting blades at their outer ends, the cutting blades being spaced from each other a distance which approximates the width of a blade with the effective edges of the blades at one side of the diameter passing through the body member being bevelled in a direction which is opposite to the direction of bevelling of the effective cutting edges of the blades at the other side of the diameter.

This invention will be best understood from a consideration of the following detailed description in connection with the accompanying drawings; nevertheless, it is to be understood that the invention is not confined to the disclosure being susceptible of such changes and modifications as shall define no material departure from the salient features of the invention as expressed in the appended claim.

In the drawings:—

Figure 1 is a fragmentary vertical section of a rotary drill constructed according to the principles of my invention, Figure 2 is an end view in elevation of a section provided with the cutting blades, Figure 3 is a view in elevation of the usual fish tail bit equipped with blades which are constructed according to the principles of my invention.

Referring more particularly to the drawings 10 designates a hollow body provided with a central passage 11 in which is slidably mounted a mandrel 12 having its outer end, as shown at 13, conically shaped. A tube section 14 is threaded into the upper end of the body member 10 and comprises a coil spring 15 which tends to maintain the mandrel in the outer end of the body 10.

A pair of shanks 20 and 21 are mounted in the outer end of the body member 10. Each shank has its inner edge, as shown at 22, bevelled to engage a conically shaped portion 13 of a mandrel 12. Each shank has a lug or key 23 located within a slot 24 of the body member 10. The outer end of the shank, as shown at 25, is expanded to provide a shoulder 26 which is adapted to engage a shoulder 27 upon the outer end of the body 10. Furthermore, the body is slotted at 28 to receive the straight edge of a shank, while the outer end of the body member is slotted to receive the shoulder 26 of the expanded portion 25 of a shank.

At the outer extreme end of the expanded portion 25 of shank 20, two cutting blades 30 and 31 are provided having one face, as shown at 32, bevelled to form a cutting edge 33. The expanded portion 25 of the shank 21 has a blade 35 having a cutting edge 36 formed by the bevelling of the blade in a direction which is opposite to the direction of bevelling of the blades 30 and 31, as shown more particularly at 37 in Fig. 2. It will be noted that the blades 30, 31 and 35 are spaced from each other a distance which approximates the width of a blade. In other words the blades are alternately disposed with respect to one half the surface to be drilled, so that while blades 30 and 31 cut two-thirds of one-half the work, the blade 35 cuts the other third and covers the space between the blades 30 and 31. By this construction it will be seen that only a portion of the work is cut by one blade while the remaining portion of the work is cut by the shank located at one side of the diameter passing through the body member and between the pair of blades.

While I have shown three cutting blades in Fig. 1 it can be seen that any number of cutting blades may be employed and disposed in alternate relation upon opposite sides of a plane passing through the axis of the body and a pair of the blades.

In the modified form as shown in Fig. 3, a fish tail bit 40 is provided having a tapered threaded portion 41 adapted to be screwed into the usual drill pipe.

A plurality of blades 42, 43 and 44 formed integrally with the bit 40 and are spaced from each other a distance approximating the width of a blade. Blades 42 and 43 are bevelled in one direction, while the blade 44 is bevelled in the opposite direction. In every instance it will be noted that I provide a certain number of cutting blades at one side of the plane passing through the axis of the body member with the blades bevelled in one direction, while the complementary set of blades on the other side of the plane being bevelled in the opposite direction.

I claim:—

In a drill, a hollow body having axial sockets provided with lateral parts on its interior and each spaced inwardly from the periphery of the body so as to completely close the outer parts of the sockets and said lateral parts thereof, said body also having its bottom edge formed with axial cut-outs in register with the sockets, blades in the sockets having keys received in the lateral parts of the sockets and having shouldered parts engaged in the cut-outs and with the end walls formed by the cut-outs, said blades having downwardly and inwardly tapered inner side edges, a mandrel in the body having a tapered part engaging the tapered edges of the blades, and means to hold the mandrel engaged with said blades.

JOHN E. LE BUS.